United States Patent [19]

Van Goubergen

[11] 4,002,315

[45] Jan. 11, 1977

[54] VIBRATION DAMPER

[75] Inventor: Willy Van Goubergen, Kraainem-Brussel, Belgium

[73] Assignee: N. V. Imexin S.A., Brussels, Belgium

[22] Filed: May 14, 1975

[21] Appl. No.: 577,472

[30] Foreign Application Priority Data

May 21, 1974 Germany .................. 7417627[U]

[52] U.S. Cl. .................. 248/24; 248/350; 267/63 R

[51] Int. Cl.$^2$ .................................. F16F 16/00

[58] Field of Search ............ 248/350, 20, 22, 24, 248/358 R; 267/136, 137, 140, 141, 152, 153, 63 R

[56] References Cited

UNITED STATES PATENTS

| | | | |
|---|---|---|---|
| 2,553,635 | 5/1951 | Dath .............................. | 267/63 R |
| 2,656,182 | 10/1953 | Willison ......................... | 267/63 R |
| 2,686,667 | 8/1954 | Willison et al. ................. | 267/63 R |
| 2,713,485 | 7/1955 | Tillou ............................. | 267/63 R |
| 2,733,916 | 2/1956 | Dentler .......................... | 267/63 R |
| 3,311,331 | 3/1967 | Steimen .......................... | 248/24 |

FOREIGN PATENTS OR APPLICATIONS 6,604,539   10/1967   Netherlands ................. 248/350

*Primary Examiner*—Robert A. Hafer
*Attorney, Agent, or Firm*—Marn & Jangarathis

[57] ABSTRACT

The invention concerns a vibration damping mat having on either side projections that, when stacking a number of such mats, so engage each other that the assembly behaves like a single thicker mat having the lateral stability of a single mat and having the same differentiated damping effect for different vibration amplitudes as a single mat, however with a different absorption percentage.

3 Claims, 3 Drawing Figures

VIBRATION DAMPER

The present invention relates to a vibration damper comprising a plate or mat manufactured from self-damping material, such a rubber or a different elastomer, said mat or plate being provided with projections perpendicular to the plate, said projections having end faces parallel to the plate and being arranged in groups of different heights.

Such vibration-damping plates or mats are described in Dutch patent No. 128.238 and are brought on the market by applicants under the trade name "RUBLOC", and are destined for installation underneath a vibration producing motor, machine, sound apparatus and the like. The projections in the known vibration damper have the shape of studs. Dependent on the weight of the machine, of the size and the nature of the vibrations, of the material of the vibration damper and of the height and diameter of sud-shaped projections, first the highest studs, then the next highest and next lower studs will be concerned in damping the vibrations. Consequently, the vibrations are progressively damped. Since the lower studs come in operation only at heavier load by a higher machine or motor weight and heavier vibrations, said lower studs may have a larger diameter than the heavier ones, so that they are better capable of taking up the heavier load.

Such vibration damping RUBLOC plates or mats provide excellent damping results and, on deflection of the compressed studs, they are likewise capable of preventing lateral sliding of a supported apparatus having the tendency to be displaced during operation, e.g.a. compressor with a flywheel.

A drawback of this known vibration damping mats is that for attaining other damping areas it is necessary to use other material and/or sizes.

It is an object of the present invention to obviate this drawback and to provide a vibration damper in the form of a stackable mat, any number of which can be conveniently stacked one onto the other, thus producing a thicker mat, while maintaining the above described favourable damping properties of the RUBLOC mats.

To this effect, in a vibration damper as described above according to the invention, at the one plate side, projections of a group having a specific height are alternated by a group of projections of less height, while at the other plate side projections having a height equal to the difference in height of the two groups at the former plate side, occupy substantially the entire plate surface, except for the regions opposite the projections having the largest height at the former plate side.

A number of such damping plates or mats can be stacked onto each other to form a vibration damper having the desired thickness, whereby the alternation of projections reaching between each other provides lateral stability, while retaining the favourable vibration damping properties inherent in the RUBLOC principle.

In the stack of mats the end or upper faces of the higher projections of the top side of a plate rest against the bottom side of a superimposed plate and simultaneously the end faces of the lower projections of the top side of the subjacent plate rest against the projections of the bottom side of the superimposed plate. With vertical loads the higher and lower projections are therefore simultaneously compressed. As a result of the different heights of the projections, their damping effect will differ, however, per group at different vibration amplitude.

It should be noted that it is possible with the vibration damping mat according to the invention, to apply it as floor covering in a workshop, while pieces of such a mat can be applied against the bottom side of a machine so that the machine can be installed loose in any place in the workshop, at the same time being anchored in a vibration damping manner.

The projections according to the invention may be designed as cams and/or studs. Preferably higher cams are alternated by rows of lower studs.

Some embodiments of the vibration damper will now be described by way of example, with reference to the accompanying drawing.

Figure 1:
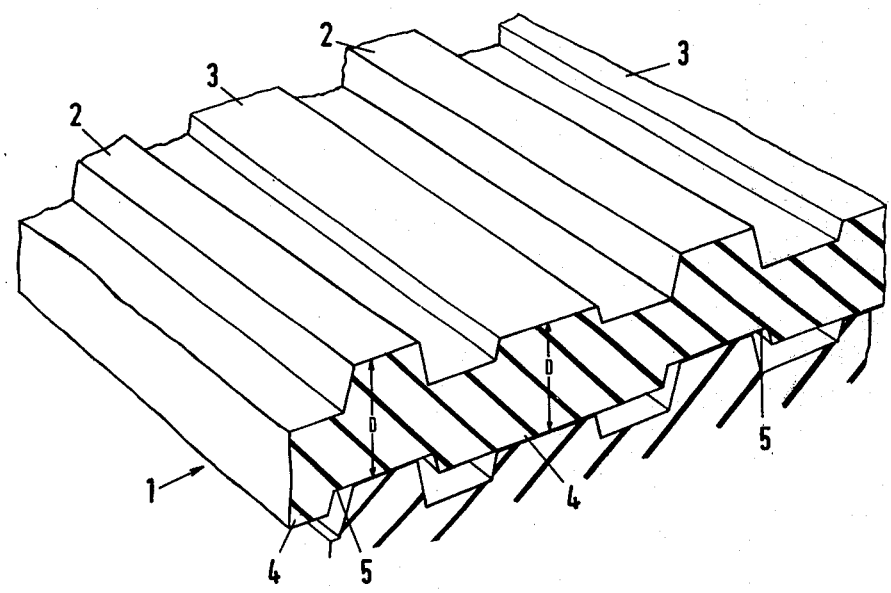
FIG. 1 shows in perspective view, partly in cross section, a detail of two stacked vibration damping mats.

According to FIG. 1 a vibration damping plate or mat 1 is provided at the top area with successive, proportionally higher cams 2 and proportionally lower cams 3. In the zones opposite the lower cams 3 there are formed cams 4 on the lower surface of the plate 1. The material thickness D adjacent the higher cams 2 is equal to the material thickness D adjacent the lower cams 3.

Underneath the mat 1 can be disposed an identical mat 1 so that the higher cams 2 rest underneath the higher cams 2 of the superimposed mat against the underside 5 of the superimposed mat, each time between cams 4 at the underside of this superimposed mat.

The damping material according to the invention is particularly suitable for solving the following problem frequently occurring in the isolation of machines. Starting from the fact that the natural frequency ($f_N$) of an elastomer body can be reduced by static deformation (depression), naturally within certain limits, and that the absorption is greater at larger ratio $f/f_N$, f being the frequency of a machine to be isolated, one is limited to a specific absorption percentage in case of specific machine dimensions, in particular the dimensions of the baseplates or legs with a given machine weight and a specific standardized damping material thickness.

Figure 3:
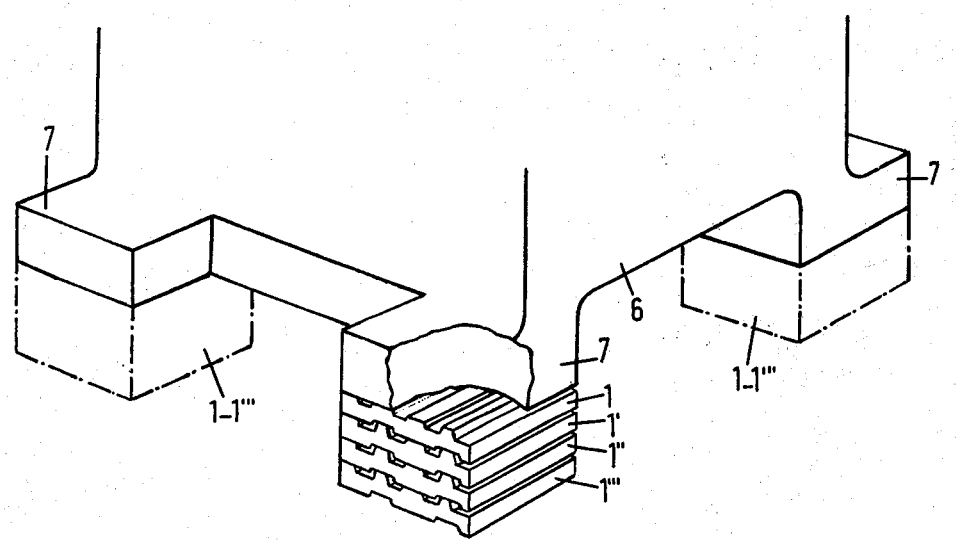
FIG. 3 shows an application of the vibration damper.

As shown in FIG. 3, a machine 6 has e.g. four legs 7, each having a given surface. Since the machine weight is also a fixed data, only a given pressure can be exerted on the damping material under each leg, resulting in a specific lineary depression of the damping material and thereby a specific absorption percentage. If a greater depression is desired, the machine weight can be increased by means of ballasts, reduction of the leg surface, a damping layer having a lower modulus of elasticity or application, with the same type of rubber, of a thicker layer under each leg. In connection with standardization, only the latter possibility is attractive, as it can be realized by positioning a number of pieces of damping material, in FIG. 3 four pieces (1–1''') under each leg. Instead of a lineary depression of e.g. 3 mm with a single layer of damping material, a depression is then attained of $4 \times 3 = 12$ mm and consequently an $f_N$ of the assembly that is substantially lower than the $f_N$ of a single layer.

The drawback of a stack of damper material with limited horizontal dimensions is that through the horizontal components of the machine vibration, the danger of shear is considerable. In case of vibration damping material according to the invention now this shear danger is effectively prevented by the alternation of projections 2,2' and 4.

Figure 2:
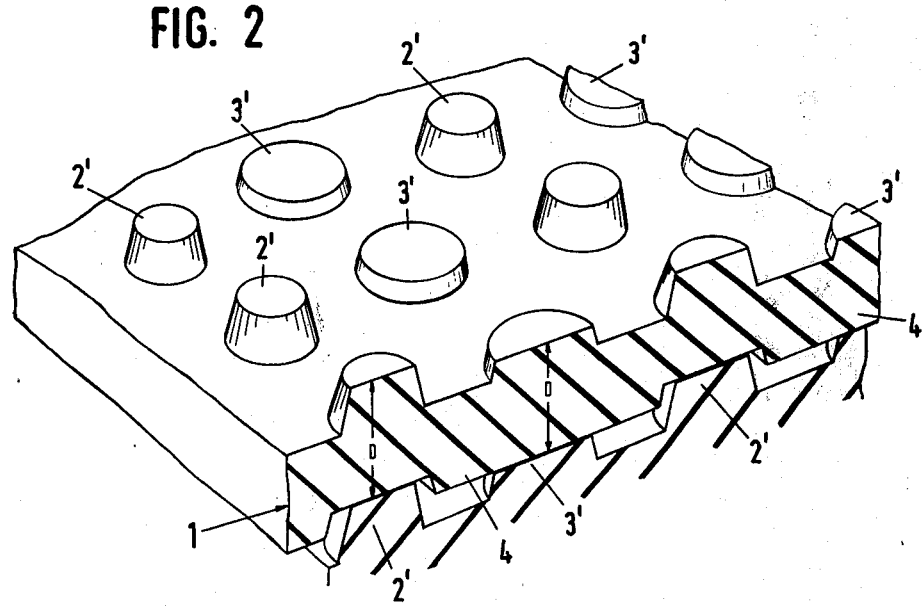
FIG. 2 shows a configuration variant.

FIG. 2 shows a variant wherein, instead of cams 2 and 3, rows of studs 2' and 3', project from the top surface of a mat or plate 1, the studs 2' being higher that the studs 3'. Also studs and cams can be alternately employed on the same mat 1, and/or alternately mats with studs and mats with cams can be stacked.

I claim:

1. A vibration damper formed of a shelf-damping material, such as rubber or like elastomer, said damper being provided with upwardly and downwardly extending projections from upper and lower surfaces, respectively, of said damper, said projections having end faces parallel to said surfaces and arranged in groups of different heights, characterized in that said upwardly extending projections are comprised of a group having a specific height with an alternate group of upwardly extending projections of less height, said downwardly-extending projections being disposed on said lower surface about substantially the entire lower plate surface except areas of said lower plate surface opposite said upwardly extending projections of said specific height, the distance between said end faces of said upwardly extending projections of said specific height and said lower surface being substantially equal to the distance between said end faces of said upwardly extending projections of said less height and said downwardly extending projections.

2. The vibration damper as defined in claim 1 wherein said projections are in the form of longitudinally extending parallelograms.

3. The vibration damper as defined in claim 1 wherein said projections are outwardly extending surfaces or rotation.

* * * * *